Feb. 25, 1969
G. A. PETRY ET AL
3,429,536
EXPENDABLE AIR CARGO PALLET
Filed Aug. 24, 1967
Sheet _1_ of 2
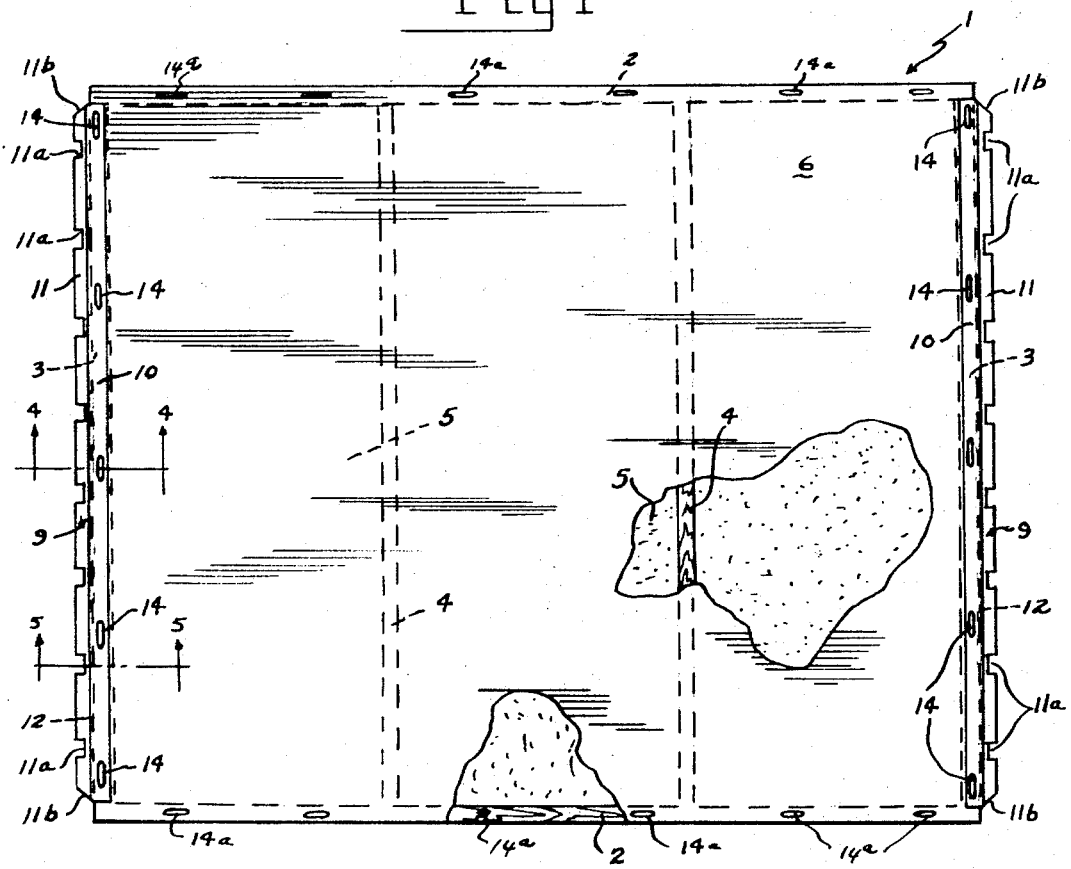
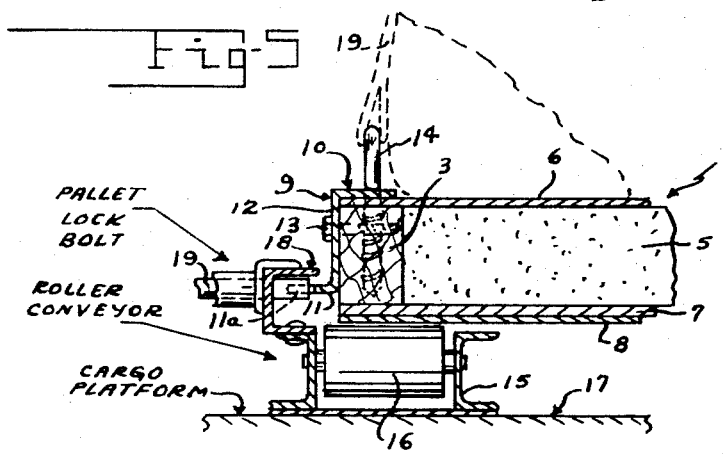
INVENTORS
GENE A. PETRY
JOSEPH L. WEINGARTEN
BY

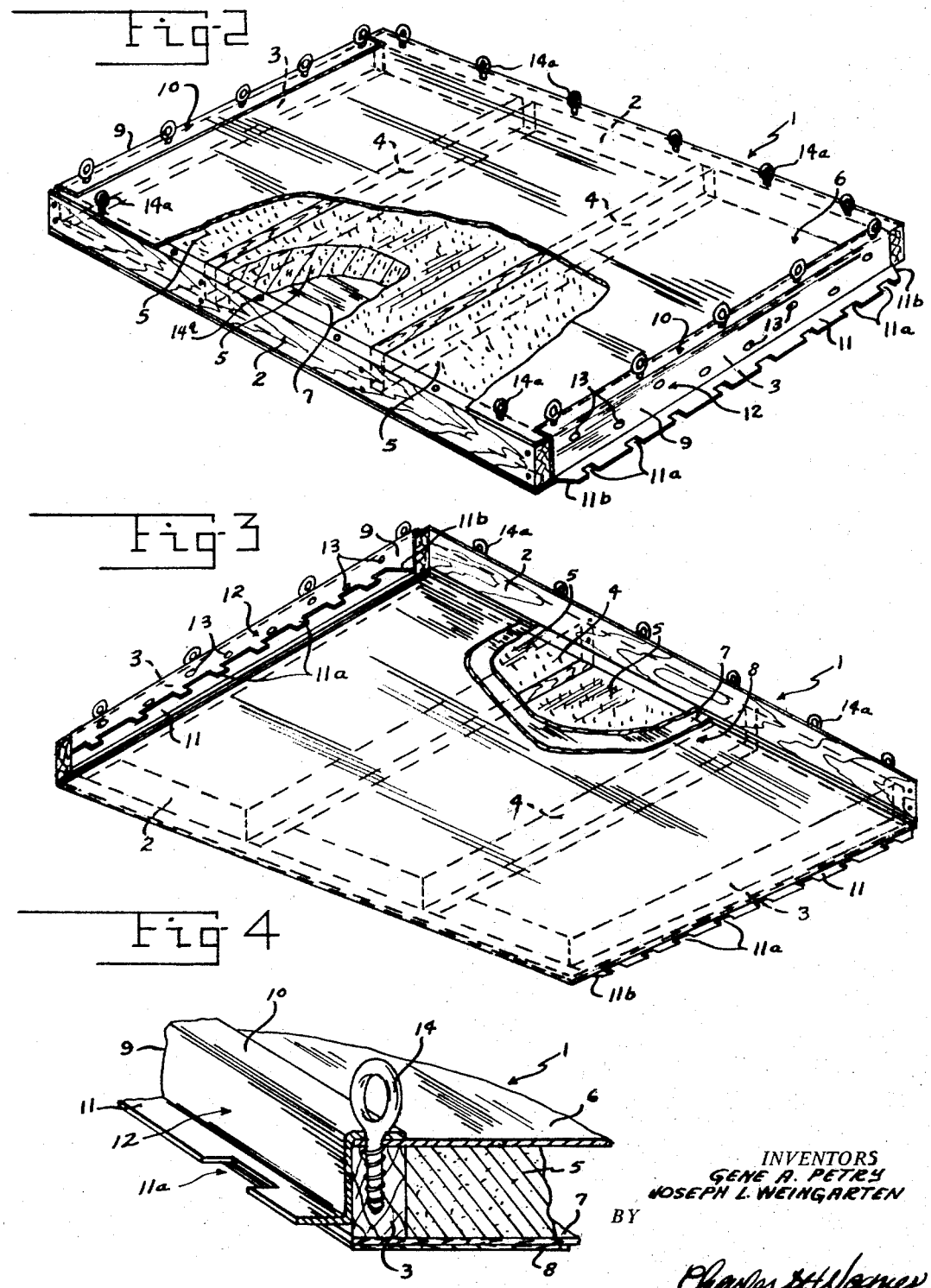

United States Patent Office 3,429,536
Patented Feb. 25, 1969

3,429,536
EXPENDABLE AIR CARGO PALLET
Gene A. Petry, New Carlisle, and Joseph L. Weingarten, Dayton, Ohio, assignors to the United States of America as represented by the Secretary of the Air Force
Filed Aug. 24, 1967, Ser. No. 663,173
U.S. Cl. 248—119    5 Claims
Int. Cl. B60p 7/14; A47b 91/08; B65j 1/22

ABSTRACT OF THE DISCLOSURE

A cargo pallet having a rectangular frame with intermediate spaced cross members. Top and bottom panels of plywood are secured to the frame, with the interior spaces being filled with polystyrene core blocks. Hold-down hardware is secured on the exterior of the pallet.

Field of the invention

The invention relates to cargo supporting and conveying pallets, and more particularly to pallets on which cargo is secured for easier handling, loading and shipping, particularly in and by aircraft. It has for an object a low cost and simple expendable pallet for cargo which is compatible with ground and aircraft materials handling systems and is particularly "fork" liftable, light weight, and meets aircraft restraint requirements for heavy loads, for instance an 8,000 pound cargo load.

Summary of the invention

The pallet design is a sandwich construction incorporating a light wooden frame, preferably of rectangular shape, comprising connected end frame and side frame members with intermediate cross frame members of the same size and shape with top and bottom marine plywood panels secured thereon, having polystyrene blocks sandwiched therebetween and filling the spaces between the end and cross frame members and securely bonded or fastened together, with a thinner bottom panel of tempered (pressed) fiberboard covering the entire bottom plywood panel and including a ⌐ angle type light metallic bar or beam secured along each of the opposite ends of the frame, over the edges at the ends of the top panel with connecting means thereon for retaining or tying down the cargo on the upper surface of the pallet to prevent relative vertical or horizontal displacement between the pallet and load while in a cargo aircraft or other transporting means.

A further object is the provision of a light and easily handled pallet for cargo aircraft which is inexpensive, easy to manufacture and is expendable.

Other objects and advantages of the invention will become apparent from the following description and accompanying drawings in which like reference characters refer to like parts in the several figures.

Brief description of the drawings

FIGURE 1 is a top plan view of a pallet made in accordance with the invention, parts of the top panel thereof being broken away to show the light weight polystyrene, or other filling blocks which are fitted between the end and intermediate cross frame members, and sandwiched between the top and bottom panels thereof.

FIGURE 2 is a perspective view of an improved expendable pallet constructed in accordance with the invention, parts of the plywood top panel being broken away to show the light polystyrene reinforcing filler blocks in place between the end and intermediate cross frame members.

FIGURE 3 is a perspective view from below, but similar to FIGURE 2, with the bottom panels partly broken away to show the polystrene reinforcing blocks in place between the cross frame members, and between the bottom and top panels.

FIGURE 4 is an enlarged detail fragmentary sectional view, taken about on the plane indicated by line 4—4 in FIGURE 1, looking in the direction of the arrows.

FIGURE 5 is an enlarged transverse vertical fragmentary sectional view taken about on line 5—5 in FIGURE 1, but showing in addition, one of the conventional type multiple roller conveyors used on the floor or cargo platform of a cargo aircraft, with the longitudinal pallet retaining or "hold down" flange strip means and the projectable locking detent means for locking engagement with the notches along the edges of the projecting flanges of the ⌐ angle beams on the ends of the pallets, to retain them in fixed position in the cargo aircraft or other vehicle during transit.

Description of the preferred embodiment

Referring to the drawings the reference numeral 1 denotes generally an expendable, lightweight, strong and inexpensive pallet constructed in accordance with the invention comprising a rectangular wooden frame of uniform thickness.

The frame 1 is composed of side frame members 2 and end frame members 3 with spaced intermediate cross frame members 4, all of the same width and thickness, preferably of 2" x 3" wood, and securely fastened together at the corners. As shown, the rectangular frame 1 may be about 104" long by 88" wide and 3 inches in thickness, and adapted for reception into a conventional C130 or C141 cargo airplane materials handling system (not shown).

The interior of the frame 1, between the two cross frame members 4, 4 and between the end frame members 3, 3 and the cross frame members 4 has fitted therein blocks of light weight "cut to fit" material, such as polystyrene blocks indicated at 5, having the same thickness as the rectangular wooden frame 1.

Two panels of marine plywood, preferably 1/4" in thickness and indicated at 6 and 7 respectively, cover the entire upper and lower surfaces of the rectangular frame 1, its cross members, and the reinforce core fillers or inserts 5, these top and bottom panels 6 and 7 being cut to extend to the sides and ends of the frame 1 as shown.

The panels 6 and 7 are securely bonded, or otherwise secured, to the opposite sides of the rectangular frame members 2, 3 and 4 by any suitable means, and may also be bonded or cemented to the opposite surfaces of the filler blocks 5 as well.

A thinner panel of tough tempered fiberboard, for instance, 1/8" pressed "Masonite," is securely bonded on the bottom of the lower panel 7 by a suitable moisture resistant glue or cement. The total thickness of the pallet as shown, is 3 5/8" although these dimensions may be varied somewhat, depending upon their required load carrying capacity.

The panels 6, 7 may also be secured to the wood stringer members 2, 3 and 4 of the frame if desired by suitable closely spaced screw fasteners, or preferably may be bonded together by a suitable resin type cement, or even "epoxy cement" to form very strong, lightweight, inexpensive and expendable pallet units.

The opposite ends of the pallets are each fitted with an elongated ⌐ shape metallic beam or bar 9 which extends substantially from one side of the pallet to the other side, as seen in FIGURES 1 to 3, and overlaps the top side edge portions 3, being preferably made of aluminum with a 1/4" thickness, having upper and lower parallel horizontal flanges 10 and 11 respectively which are 2" wide from the adjoining intermediate flange 12 that is approximately 3 inches in width.

These angle bars 9 each have their intermediate flange or surface 12 secured flush against the outer vertical sides of the end frame members 3 with the top horizontal flanges 10 disposed in overlapping relation over the edges of the end portions of the top panel 6, and overlay the end frame members or "stringers" 3.

The angle bars 9 are securely retained against the outer surfaces of the end cross frame members 3 by screw fasteners, such as "lag screws" 13 which pass through suitable apertures in the intermediate vertical flanges 12 and extend materially into the cross frame members 3, as seen in FIGURE 5. The upper pallet overlapping flanges 10 are apertured at suitably spaced intervals along their lengths, substantially as shown in the drawings, and cargo "hold down" screw eyes 14 pass through these apertures extending substantially into the end frame members 3, somewhat similar as depicted in FIGURE 4. These screw eyes 14 also hold the horizontal overlapping top flanges 10 down securely against the top edges of the ends of the upper panel 6.

The outer edges of the lower or outstanding horizontal flanges 11 of the bars 9 are uniformly notched throughout their length as shown. These notches are preferably about 2½″ x 1⅛″ deep with a spacing of about 10″ between centers, also both ends of these outstanding flanges 11 are beveled, at approximately 45°. When cargo boxes, bundles, etc., are placed on the pallets, cargo retainer straps such as 19 are passed over and around the cargo with the ends securely fastened to the "hold down" screw eyes 14 to retain the cargo on the pallets 1 against any undesirable relative shifting movements in any direction during handling, transit and loading.

Usually when shipment is made by cargo aircraft, the floor of the cargo compartment is provided with the longitudinal parallel roller conveyor members, somewhat similar to the roller conveyors indicated at 15 and seen in section in FIGURE 5. These conveyors 15 are fastened to the floor 17, although they may be made detachable and removable if desired, and preferably extend to the outer or loading end of the aircraft, and are conventional equipment.

The loaded pallets 1 are placed on the conveyor rollers 16 for instance by "fork lift trucks" and then rolled forward to the desired positions in the compartment. Provision is made for flange "hold down" means for the pallets. This comprises spaced longitudinal flange members 18 which may be either secured directly to the floor 17 or to the conveyor rails 15 at a predetermined height above the tops of the rollers 16, and at opposite ends of the pallets to receive the outwardly projecting longitudinal flanges 11 of the ⌐ bars 9 thereunder, but in fairly close relation. This prevents any appreciable or dangerous relative "upward" movement of the pallets (and the cargo secured thereon) during transit.

These rails 18 being disposed at the opposite ends of the pallets in predetermined fairly close spaced relation to the outer edges of the flanges 11, also resist appreciable relative lateral movement of the pallets when interposed between these hold down rails 18. Also conventional latching means or projectable locking bolts 19 are provided in the cargo compartments adjacent and below these overhanging "hold down" rails 18 for projection inwardly toward the ends of the pallets or withdrawal outwardly. When projected inwardly, with the pallets in position, these latches or bolts engage one (or more) of the notches 11a in the outer edges of the flanges 11 at the opposite ends of pallets. This arrangement anchors the pallets under the flanges 18 against any appreciable longitudinal shifting on the conveyors 15, while the angularly cut ends 11b of the flanges 11 facilitate the insertion of the flanges 11 between and under "hold down" rails 18.

In addition to the screw eyes 14 across the end of the pallet 1, screw eyes 14a are secured in both of the end frame members 2 at suitable spacing, for instance a minimum of six across each end.

For purpose of exemplification, a particular embodiment of the invention has been shown and described to the best understanding thereof. However, it will be apparent that changes and modifications in the arrangement and construction of the parts thereof may be resorted to without departure from the true spirit and scope of the invention as defined in the accompanying claims.

I claim:

1. An expendable cargo pallet comprising, a rectangular wooden pallet frame of uniform thickness having similar parallel opposite end frame members, parallel opposite side frame members, and parallel intermediate cross-frame members extending between said side frame members, all securely connected together, plywood top panel and similar bottom panel members respectively completely covering the top and bottom surfaces of said rectangular frame, lightweight polystyrene reinforcing block members filling the interior of said frame, sandwiched between said top and bottom panel members in surface contact therewith, an elongated ⌐ angle bar extending substantially across each of the opposite ends of said pallet frame each having an upper horizontal flange overlapping one of the edge portions of the top panel member between the opposite sides of the frame, and overlapping the tops of the end frame members, said ⌐ angle bars each having an intermediate vertical web portion in contact with the outer vertical surface of each of said pallet end frames members, substantially throughout the lengths thereof, and having a plurality longitudinally spaced screw fastener receiving apertures formed therein intermediate the upper and lower longitudinal edges thereof, screw fastener members extending through said apertures materially into said end frame members for securing said ⌐ flange members to said pallet end frame members with said overlapping horizontal top flange portions in overlapping contact relation along the opposite ends of said top panel member, said ⌐ angle bar members each having a horizontally projecting bottom flange portion from end to end thereof in predetermined elevated relation above the bottom surface of said bottom panel member with the outer edge portion thereof notched inwardly at closely spaced uniform intervals throughout the lengths thereof, for locking engagement with horizontally projectable locking bolts disposed at opposite sides a conventional cargo supporting platform having spaced parallel longitudinal cargo pallet hold down horizontal flange means secured thereon for receiving the pallets therebetween with said outstanding notched edges of the ⌐ angle bars slidable thereunder to prevent relative displacement of the cargo pallets in transit while on the platform.

2. An expendable cargo pallet as set forth in claim 1 in which the top overlapping flange portions of the elongated ⌐ angle bars are apertured between the longitudinal edge portions thereof at spaced intervals, and cargo hold down attachment screw eyes are disposed in said last mentioned apertures and extend downward materially into the end frame members of the pallets, for the attachment of cargo encircling and "hold down" strap members thereto to resist displacement of cargo when mounted on said pallets.

3. A lightweight expendable cargo pallet comprising a rectangular frame of uniform thickness having end and side frame members and intermediate cross frame members between the side frame members, a plywood load receiving top panel member of uniform thickness secured across the top of said frame from side to side and end to end thereof, a plywood bottom member of uniform thickness secured across the bottom of said frame end to end and side to side thereof, a second bottom panel of tempered fiberboard secured across said bottom panel from end to end and side to side thereof, reinforcing block members of lightweight aerated material sandwiched between said top and bottom panel members in supporting contact relation between the lower surface of said top panel member and the upper surface of said bottom plywood panel member, completely filling the interior of said frame, elongated lightweight metallic ⌐ angle bars extending across the opposite ends of said frame having an upper horizontal flange portion overlying each of the end portions of said top plywood panel member and said end frame members substantially between the opposite sides of the top plywood panel member, and in contact with the top surface of said plywood panel member, cargo "hold down" attachment securing screw eye members extending downwardly through said upper overlapping flange portion into said end frame members at longitudinally spaced intervals between the opposite ends of said ⌐ angle bars, said ⌐ angle bars each having an intermediate vertical web portion in flush contact with each of the opposite ends of said rectangular frame against the end frame members between said top and bottom plywood panel members, a plurality of longitudinally spaced screw fastener members extending through said intermediate vertical web portions between the top and bottom edges thereof materially into said end frame members to secure said web members against said end faces of said frame members, said ⌐ angle bars each having a lower horizontal flange portion from end to end thereof spaced downwardly below said upper flange portions in parallel relation thereto at a distance not greater than the thickness of said rectangular frame, projecting horizontally outward away from the ends of the pallet frame, for reception under and between conventional horizontally spaced parallel pallet "hold down" track flanges fixed in vertically spaced conventional relation above a cargo pallet receiving and supporting platform, for retaining said pallets during transit, against excessive relative horizontal and vertical movements.

4. A pallet as set forth in claim 3 in which the outer edges of said lower horizontal flange portions of said ⌐ angle bars are notched inwardly at uniformly spaced intervals between the ends thereof.

5. A lightweight expendable pallet as set forth in claim 4 in which said reinforcing block members comprise paper honeycomb cores bonded at opposite sides to said top and bottom panel members.

References Cited
UNITED STATES PATENTS

| | | | |
|---|---|---|---|
| 2,949,863 | 8/1960 | Cozzoli | 104—135 |
| 3,026,817 | 3/1962 | Sebastian et al. | 104—135 |

ALBERT J. MAKAY, *Primary Examiner.*

U.S. Cl. X.R.

248—346, 361; 108—55